April 5, 1966 G. C. BULL, JR 3,244,326
APPARATUS FOR DISPENSING FLUID MATERIAL
Filed Feb. 27, 1963
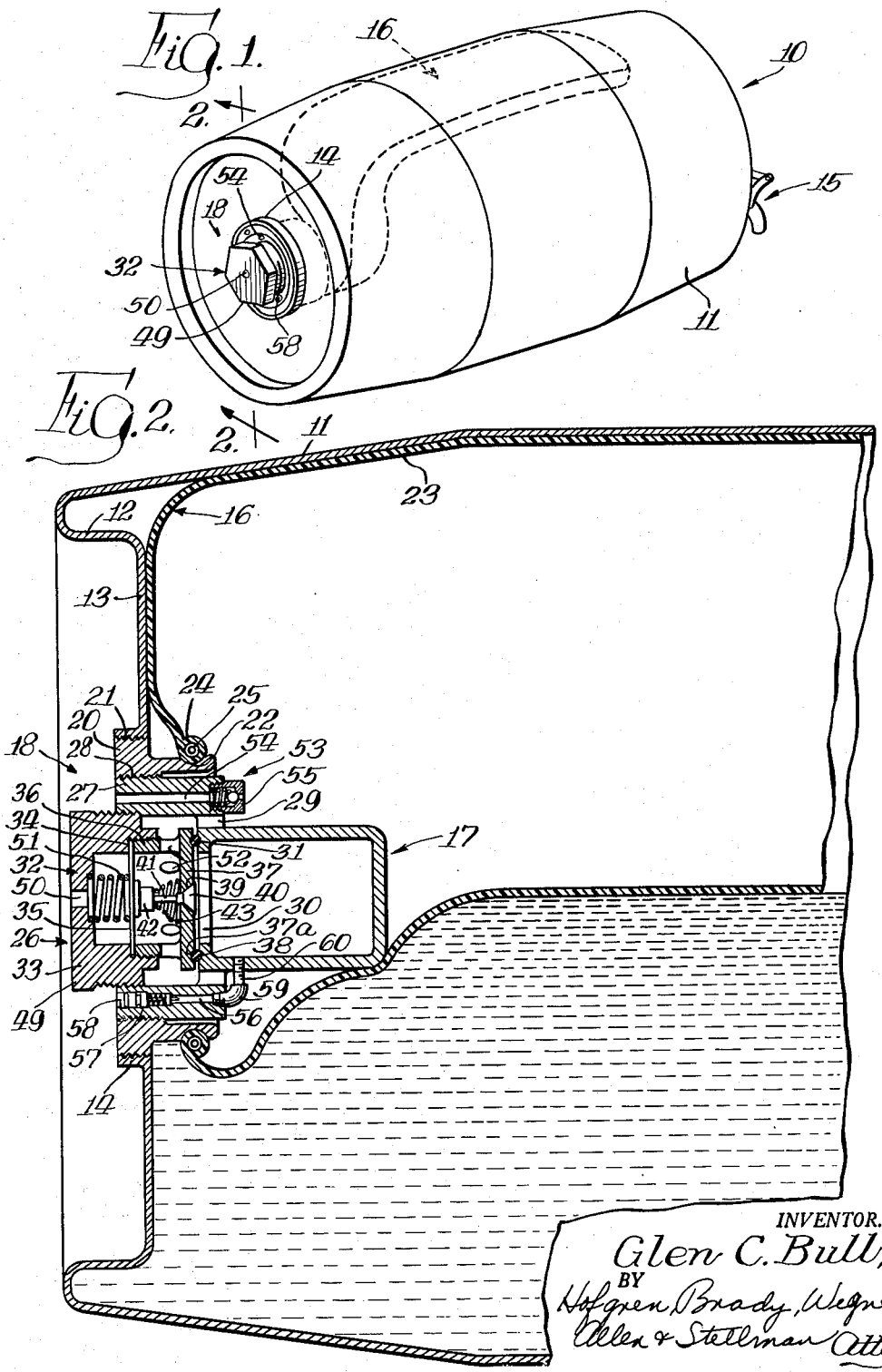
INVENTOR.
Glen C. Bull, Jr.
BY
Hofgren, Brady, Wegner,
Allen & Stellman Atty's.

United States Patent Office 3,244,326
Patented Apr. 5, 1966

3,244,326
APPARATUS FOR DISPENSING FLUID MATERIAL
Glen C. Bull, Jr., 410 Wakefield St., Alexandria, Va.
Filed Feb. 27, 1963, Ser. No. 262,816
3 Claims. (Cl. 222—61)

This invention relates primarily to the packaging, preserving and dispensing of draught beer.

Draught beer is generally acknowledged among beer drinkers to have superior flavor characteristics over bottled or canned beer which is normally pasteurized so that it does not require constant refrigeration. Draught beer is normally available only in taverns and similar commercial establishments which can afford to purchase and properly care for the relatively expensive and cumbersome equipment presently required to maintain the proper pressure, temperature, and desirable taste characteristics of barreled draught beer.

Throughout the years various expedients have been suggested for providing draught beer in a portable pressurized receptacle suitable for storage in a household refrigerator for home consumption and from which the beer could be incrementally dispensed. Among the first of many U.S. Letters Patents directed to this general problem were U.S. Patents Numbers 6,393 issued Apr. 24, 1849; 581,355 issued Apr. 27, 1897; and 609,970 issued Apr. 30, 1898. More recent Letters Patents which have attempted to solve the problem of packaging draught beer for home use include U.S. Patents Numbers 2,090,403 issued Aug. 17, 1937; 2,774,521 issued Dec. 18, 1956; and 2,812,109 issued Nov. 5, 1957. However, these prior efforts have failed to produce a satisfactory or a commercially acceptable draught beer container-dispenser for home use.

Apparently the first successful development for commercially providing draught beer for home use is embraced by the disclosures of the application of John H. Bull, Serial No. 824,965, filed July 6, 1959, now abandoned, in which a spigotted container of beer has an expansible pressure bag adapted when inflated to fill the container and into which has been sealed a gas generated substance such a solid carbon dioxide (Dry Ice) which will gradually generate sufficient gas to expand the bag, thereby exerting the pressure desired on a beer to preserve its natural effervescence and to discharge it in desired quantities through the spigot.

The present invention comprises, in brief, maintaining a substantially constant desired pressure on a body of beer within a spigotted container of draught beer by incrementally admitting gas under pressure from a reservoir into an expansible bag within the container, to preserve the effervescence of the beer and to discharge desired quantities of beer when the spigot is opened.

The primary object of this invention is, therefore, to effectively, economically, and safely store, transport, and incrementally dispense beer at a nearly constant pressure from a packaged unit.

Another object of this invention is to provide for the safe, convenient, and economical handling, storing, preserving, transporting, and/or dispensing of any liquid which requires a continuous surface pressure, or freedom from contamination by air or other similar influences, or a covering membrane which will effectively follow the liquid surface as the liquid is dispensed, or any combination of these requirements, at a pressure which remains nearly constant as the liquid is dispensed.

A further object is to provide a pressurized container for a product in which a pressurizing medium and related control mechanism are housed within the container and entirely separated from the product.

A still further object is to provide a unit for commercially distributing packaged draught beer for home use.

The invention is illustrated in a preferred embodiment in the accompanying drawings in which:

FIG. 1 is a perspective view of a container in accordance with the invention; and FIG. 2 is a fragmentary vertical section on an enlarged scale taken substantially as illustrated along the line 2—2 of FIG. 1, illustrating the approximate conditions in the container when about half of the beer has been dispensed.

Referring to the drawings in greater detail, a container, indicated generally at 10, is illustrated in the form of a small keg having a continuous side wall 11 with a return bend 12 at one end providing a head 13 on which there is a central, internally threaded boss 14 affording a bung hole as is customary in beer keg construction. At the opposite end of the container is a spigot of conventional construction, indicated generally at 15.

Since the beer container here disclosed is intended for home use, it is of relatively small size, being suitable to hold and dispense approximately 288 ounces of beer which is a standard unit in many tax, transportation, and other laws and regulations. It is the equivalent volume of a case of 24 twelve-ounce bottles or cans.

In order to provide this effective capacity it is necessary to give the container sufficient head space to accommodate a pressure chamber or bag, indicated generally at 16, which is a bag of limp sheet material, and a pressure reservoir, indicated generally at 17.

In order to prevent the beer from going flat by loss of carbonation it is necessary to maintain a pressure on the beer which is at least equal to the pressure of the dissolved $CO_2$ in the beer. The pressure of beer is in the neighborhood of 10 to 14 p.s.i.g. at dispensing temperatures of 38° to 42° F., and may increase to 18 to 20 p.s.i.g. at 54° F., the maximum temperature which unpasteurized beer should be permitted to reach. To give a good margin of safety in preserving the effervescence of the beer during transportation, the pressure chamber should be capable of providing a pressure up to about 30 p.s.i.g. in the container. The least pressure which should be permitted is about 10 p.s.i.g., and this pressure is reached only after some beer has actually been dispensed through the spigot.

The capacity of pressure reservoir 17 is co-ordinated with the pressure of the gas in the reservoir to provide an amount of gas which at 10 p.s.i.g. will completely fill the container 10. For example, if pressure reservoir 17 is charged with gas at 20 p.s.i.g. the reservoir must be one-eighth the size of the container. Since the container is designed for 288 ounces of beer, or 2¼ gallons (518.4 cubic inches) the pressure reservoir must have a capacity of 64.8 cubic inches. Allowing approximately 10 percent of the total volume of the fluid chamber for the initial volume of the pressure chamber, the total volume of the container is about 635 cubic inches, consisting of 518.4 for the initial volume of the fluid chamber, 64.8 for the pressure reservoir, and 51.8 for the initial volume of the pressure chamber. The total size of the container may be reduced by increasing the pressure in pressure reservoir 17. It is possible to operate with pressures in the pressure reservoir as high as 600 p.s.i.g. in which event the volumetric capacity of the reservoir need be only about 13 cubic inches.

As seen in FIG. 2, the pressure chamber 16 and pressure reservoir 17 are parts of a bung assembly, indicated generally at 18, which includes an annular bung 20 having an outer thread 21 to screw into threaded boss 14 of the container. At its inner end the bung 20 has a circumferential external groove 22. The pressure chamber 16 is in the form of an expansible bag of inelastic material having a continuous limp wall 23 provided with a restricted throat which is defined by a molded bead 24 in which there is a reinforcing wire 25. Bead 24 is firmly seated in the circumferential groove 22 of bung 20.

The pressure chamber 16 must be formed of a material which meets certain requirements. First, the material must be impermeable to the gas with which the pressure reservoir and the pressure chamber are charged. Second, the material must be inert to beer or any other fluids which are to be stored in and dispensed from container 10 so as to impart no undesirable flavor to the fluid. The material must be limp and readily deformable, and must not be subject to deterioration within ordinary time limits, especially in the presence of the materials with which it must come in contact.

One material which is particularly suitable for this purpose is a polymer coated polyester film consisting of a reaction product of ethylene glycol and terephthalic acid, such as is currently manufactured by E. I. du Pont de Nemours & Company, and sold under the trade name Mylar, Type K. It is available in various thicknesses and, because of the strength of this particular product, the 25-gauge (.00025 inch) or anything up to the 100-gauge (.001 inch) is suitable. A greater thickness will serve no useful purpose and will add unnecessarily to the bulk of the bag 16.

The continuous wall 23 of pressure chamber 16 must be of a size and shape which permits it to expand within the container 10 and conform closely to the interior shape of the container, so that as the beer or other fluid is dispensed from the container the pressure chamber may gradually expand to fill the entire container.

Pressure reservoir 17 is part of a pressure regulating assembly, indicated generally at 26, that includes an externally threaded mounting shell 27 which screws into an internal thread 28 of annular bung 20. Mounting shell 27 has at its inner end a plurality of spaced radially extending arms providing a web 29 which supports pressure reservoir 17 in spaced relationship to the threaded wall of shell 27. The pressure reservoir takes the form of a cup of suitable capacity, as heretofore described, and the reservoir has a circumferential rim 30 at its open outer end, between the arms 29, which is provided with a sealing groove 31.

The assembly 26 also includes a pressure regulator valve assembly, indicated generally at 32, which has an externally threaded valve body 33 that screws into an internal thread of shell 27. Valve body 33 is a cup-like member which is internally shouldered at 34 and threaded to receive a diaphragm 35 and valve base 36 which has a bottom wall 37 with an annular groove 37a to confront sealing groove 31 in the rim 30 of the pressure reservoir 17 as valve body 33 is screwed into the shell 27; and a sealing ring 38 in groove 37a compresses into groove 31 to seal the pressure reservoir.

The bottom wall 37 of valve base 36 has a chamfered valve opening 39 providing a seat for a charging valve 40 which has a stem 41 extending into valve base 36. At the outer end of stem 41 is a small spring cup 42 to receive a compression spring 43 which also bears against the bottom wall 37 of the valve body. Thus, charging valve 40 is normally closed, and controls the release of gas from pressure reservoir 17 by operation of diaphragm 35, against which cup 42 bears.

Regulator valve body 33 includes an end wall 49 provided with a center hole 50; and a regulator spring 51 is compressed between wall 49 and diaphragm 35. Between the bottom 37 and the shoulder 34, regulator valve base 36 is provided with one or more openings 52, so that one side of diaphragm 35 is subject to pressure from the pressure chamber 16. The regulator valve is calibrated to open when pressure in the chamber 16 drops to 10 p.s.i.g. The regulator valve is preset, and no provision is made for adjusting it because it is not desirable for customers to be able to change the valve setting.

In order to prevent development of excessive pressure in the pressure chamber 16 by reason of failure of regulating valve assembly 32, a pressure relief valve system 53 is provided to vent excessive pressure from chamber 16 to the ambient atmosphere, regardless of the cause of the excessive pressure. For this purpose a passage 54 extends through regulating assembly sleeve 27 so that the inner end of the passage is open to pressure chamber 16 and the outer end is open to the atmosphere. A check valve assembly 55 is mounted at the inner end of passage 54, and is set to open at a pressure which depends upon the characteristics of the carbonated beverage stored in the container 10. As previously described, in the case of the beer this pressure should be about 30 p.s.i.g., so that the carbonation in the beer will remain in solution at all temperatures normally encountered during shipping and storage of the beer.

The filling and preparation of container 10 for dispensing of beer may be readily handled by first filling the container through the bung hole 14 with a measured amount of beer, such as 288 ounces, and thereafter inserting the annular bung 20 into the bung hole with the pressure chamber deflated and the regulating assembly shell 27 and the integral reservoir 17 in the bung. The pressure reservoir 17 is most conveniently charged by filling it with a suitable amount of solid carbon dioxide and promptly screwing the regulator valve assembly 32 into the shell to seal the reservoir. Since there is no pressure in the pressure chamber 16, the regulator valve is open, and gas generated by sublimation of the solid carbon dioxide goes into the chamber until the pressure reaches 10 pounds when valve 40 closes.

If it is desired to assure that the beer will lose no carbonation even at temperatures up to about 54° during shipping, pressure in the chamber may be raised to 30 p.s.i.g. by inserting a rod through opening 50 in the end wall 49 to depress diaphragm 45 and unseat charging valve 40, which permits gas to pass into the pressure chamber until gas escapes through safety valve passage 54.

Assuming that check valve 55 is set to open at 30 p.s.i.g., there is 30 pounds of dispensing pressure upon the beer in the container; and when the spigot 15 is opened this pressure acts to expel the beer through the spigot. Pressure chamber 16 expands as the beer is dispensed from the container, so that the container is always completely filled by the beer and the increasing volume of the pressure chamber. When the pressure in chamber 16 drops to 10 p.s.i.g. the valve 40 opens to permit more gas from pressure reservoir 17 to enter pressure chamber 16 and thus maintain the gas pressure on the beer continuously at a minimum of 10 p.s.i.g.

The amount of solid carbon dioxide required to generate the gas needed to have a residual pressure of 10 p.s.i.g. in the pressure chamber when the container 10 is empty is about 30 to 35 grams.

It is obvious that the pressures at which charging valve 40 and check valve 55 open may be varied to suit the particular conditions under which various fluids are stored and dispensed.

Plainly, the use of solid carbon dioxide merely provides a convenient means of charging the pressure reservoir 17; and it is perfectly possible to provide a reservoir which is initially charged with gas at the calculated pressure.

To permit reservoir 17 to be charged with air under pressure, or any other gas, shell 27 is provided with a pressurizing bore 56 the outer end of which is counterbored and threaded to receive a valve 57 and closure plug 58. At the inner end of bore 56 is a threaded counterbore to receive a nipple 59 for a pressure tube 60 which is screwed into a hole in the side wall of pressure reservoir 17.

If the pressure reservoir is to be charged with air the container 10 is first filled with beer, and the entire assembly of bung 30, bag 23, and pressure regulating assembly 26 is screwed into bung hole 14. Since the bag is empty there is no pressure on charging valve 40, and it is open.

The closure cap 58 is removed and pressurizing bore 56 is connected to a source of high pressure air having a pressure gauge to show attained pressure in the reservoir. The air goes through the pressure reservoir 17 and the valve opening of charging valve 40 until pressure in the pressure chamber 16 (bag 23) reaches 10 pounds, whereupon the charging valve closes and air is pumped into the reservoir 17 until the desired reservoir pressure is reached. The source of air under pressure is then disconnected from the bore 56, and closure cap 58 is replaced to protect valve 57. Preferably cap 58 is of a type requiring a special wrench, to prevent tampering with the valve.

My invention also contemplates the dispensing of a finely divided powder and in the appended claims the term "fluid" is understood to include such powder.

The term "beer" as used herein is also used in a broad illustrative sense. Obviously the invention is applicable to the packaging of any beverage or other liquid where any one or more of the advantages of this invention are desired. Although it is particularly adapted for carbonated or other gaseous fluids, it has certain distinct uses in connection with non-gaseous fluids.

The foregoing detailed description is given for clearness of understanding only and no unnecessary limitations should be understood therefrom, as modifications will be obvious to those skilled in the art.

I claim:

1. In combination with a dispensing container having a filling bung opening therein, a fluid dispensing assembly comprising, in combination, a flexible bag sealed about the bung opening within the container; a bung element removably secured in said opening, said bung element including a pressure reservoir, a valve providing communication between said reservoir and said flexible bag, means responsive to pressure in said bag operably engaging said valve, and valved means providing communication from externally of said bung with said pressure reservoir.

2. A combination as defined in claim 1 wherein said bung includes a pressure relief valve providing communication between said bag and the atmosphere externally of said container.

3. In combination with a dispensing container having a filling bung opening therein, a fluid discharging assembly comprising, in combination, a flexible bag sealed about the bung opening inside the container; a bung having means detachably engaging in said opening, said bung being provided within the container with a pressure reservoir chamber, a spring loaded valve responsive to the pressure in said bag controlling communication between said reservoir and said bag, a passage in said bung permitting adjustment of the spring load on said valve from externally of said container, a conduit extending through said bung from externally thereof into said reservoir, a non-return valve in said conduit, and a spring loaded relief valve in said bung providing communication between said bag and the atmosphere externally of said container.

References Cited by the Examiner

UNITED STATES PATENTS

| | | | |
|---|---|---|---|
| 1,001,805 | 8/1911 | Bergsvik | 222—386.5 |
| 1,977,862 | 10/1934 | Scholtes | 222—386.5 |
| 2,501,611 | 3/1950 | Nicholson | 141—3 |
| 2,513,455 | 7/1950 | Cornelius | 222—399 X |

LOUIS J. DEMBO, *Primary Examiner.*